8736¼X
J. Deakyne.
Straw Cutter.
No Printed Specification Available
Patented Apr. 2, 1835.
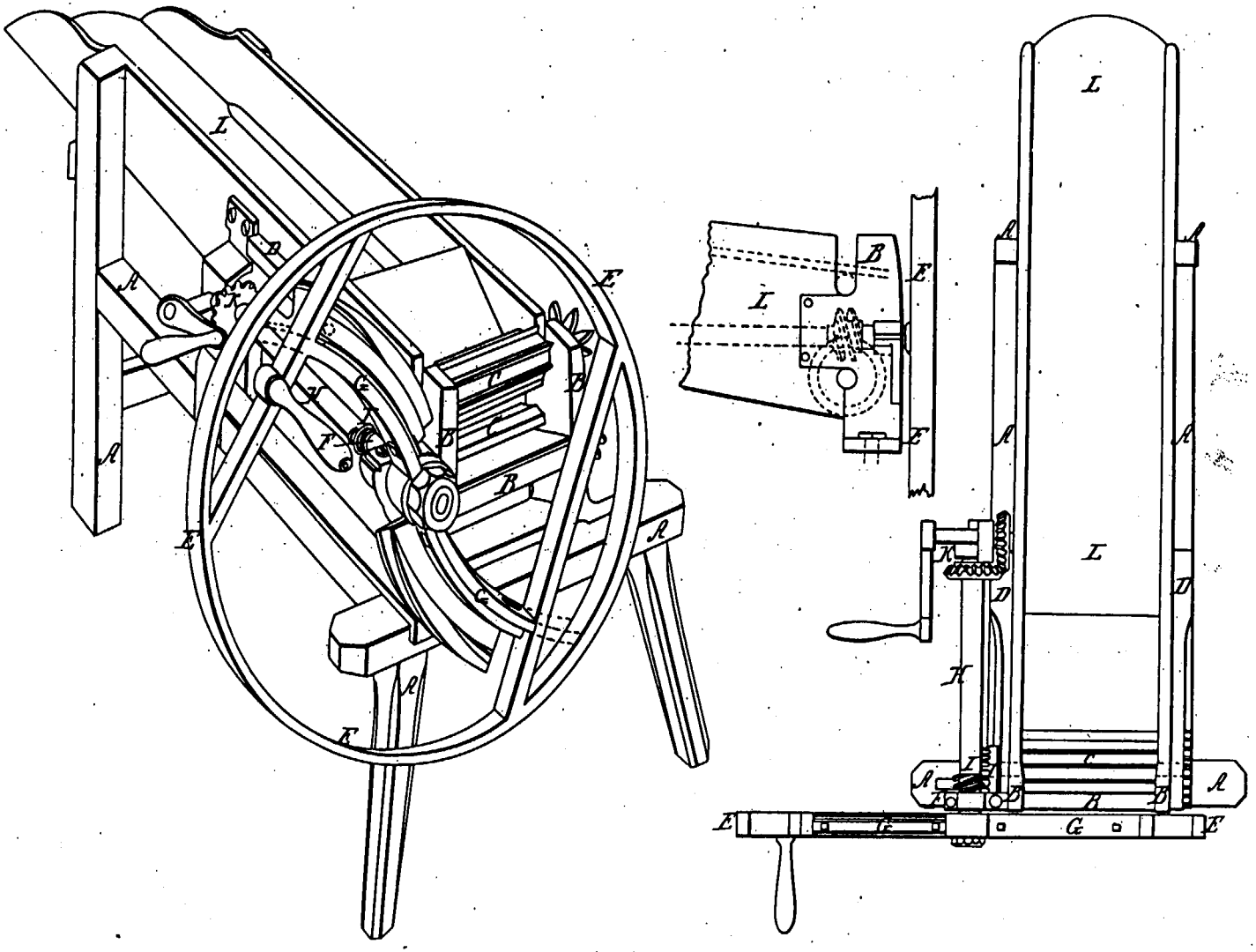

8736 [illegible] Apr 2. 1835 [illegible] 189

John Deakyne. Petersburgh Virginia

April 2, 1835

Letters Patent

The Schedule, referred to in these Letters Patent and making part of the same Containing a description in the words of the said John Deakyne himself of his improvement in a Straw Cutter.

To all to whom these presents shall come Be it known that: I John Deakyne of the Town of Petersburgh in the County of Dinwiddie and State of Virginia have invented a new and useful improvement in the Straw Cutter and that the following is a full and exact description thereof.

On a wooden frame supported by four legs two of which extend above the frame a little [illegible] as uprights [illegible] is bolted or screwed a cast iron front or mouth piece of any desired width [illegible] with sides [illegible] from side to side: between the sides of the mouth piece [illegible] fluted or ribbed cast iron rollers are placed: being three or four inches diameter [illegible] two inches apart and supported by their axes resting in the sides of the mouth piece which sides are five or six inches broad. A box from four to five feet long and just the width of the mouth piece is secured between the two uprights with its sides lapped on the sides of the mouth piece an inch and a half or two inches so that the ends of the sides of the box may press up against the axes of the rollers as they rest on the mouth piece; the box and mouth piece are then secured together with screws. A steel spring is screwed on each side of the box with one end pressing on the axis of the upper roller permitting it to rise a little by the pressure of the straw between the rollers when necessary. The Mouth piece has a projection of four or five inches on one side which serves as a bearing or box for the fly wheel shaft. The fly wheel is cast iron and two and a half or three feet diameter it may be made either with two or with three arms which should be a regular curve from the centre of the wheel to its [illegible] and a knife or cutter attached to each arm. The cutters are [illegible] inches wide one eighth of an inch thick and curved to correspond with the arms of the fly wheel to which they are attached. The method of attaching them is as follows: screw each knife to the side of a piece of iron which fits on the centre side of the worm and which piece of iron is fastened to an arm with the screw
bolts the holes in the piece of iron through which the screw bolts pass being longer
one way than the other for the purpose of moving the said piece of iron on the arm
of the wheel in order that the knives or cutters which are attached to them may
be correctly set just up to the mouth piece against which they work and
by the motion of the fly wheel cut through the straw as it is brought forward
by the revolution of the rollers. The shaft or axis on one end of which the fly
wheel is hung is made of iron; it is eighteen or twenty inches long and works
parallel with the side of the box and two inches from it. When the machine is
single geared or constructed so as to cut but one length of straw there is a worm
fixed on the fly wheel shaft near its bearing on the projection of the mouth
piece which works in the cogs of a face wheel that is fixed on the end of the
axis of the lower feed roller and as this roller is turned by the gearing of the
worm and face wheel it puts the upper roller in motion by means of spur
wheels on the other end of their axes. But when it is double geared or so con
=structed as to cut two or more different lengths, then on the upper end of the
fly wheel shaft is fixed a mitre wheel four and a half or five inches diame
=ter with another of similar size geared into it the axis of which passes un
=der the bottom of the box to the other side where a piece of cast iron is screwed
on to receive it, the ends of both shafts on which the mitre wheels are fixed
work in an iron knee or brace having an offset so that one end can be screwed
to the side of the box and the other end to the outside of the frame. On the in
=side of the frame and ~~on the~~ outside of the box next to the shaft of the fly wheel
is screwed a straight iron brace with a short iron stud or axis riveted into
it on which axis is hung a face wheel eight or nine inches diameter having
a double set of cogs upon its face or outside and also a small spur pinion cast
to it on the other side which pinion gears into another nearly double as large
that is fixed on the axis of the lower feed roller. A small pinion is pinned on
the shaft of the fly wheel and is geared into one row of cogs of the face wheel;
so that by moving the pinion to work in the other row a different length of
straw will be cut. The fly wheel may be put in motion either by the handle
which is screwed to one of its arms or by the crank that is fixed on the end of
the mitre wheel axis which works under the box

What I claim as my invention and improvement and not previously known
in the above described Machine is first the method of [illegible] the bearings
for the feeding rollers by capping the sides of the box in the sides of the mouth
piece the ends of the rollers resting on the mouth piece and working against
the ends of the side boards, as described within. Secondly the method of fixing
the cutters on the arms of the fly wheel by screwing them to pieces of iron and
then securing the pieces of iron to the arms of the wheel by screws in such a manner
that will permit them to be movable upon the arms, for when attached in this
way the knives may be made very thin and be sufficiently strong and firm
by the support of the pieces of iron on their sides; and they can also be accurately
adjusted to cut close to the cast iron mouth piece without their slipping
and causing [illegible] with it

Witnesses
G. S. Thomas.
[illegible] Bragg -

John Deakyne

Ex.d
C.S.W.

(Drawing)

1184 [illegible]

(Patented April 2. 1835)